Feb. 2, 1965    A. R. CUNNINGHAM    3,168,058
REPLACEABLE TUBE INSERT FOR A PELLETING MACHINE
Filed Oct. 1, 1962    2 Sheets-Sheet 1

INVENTOR.
ARTHUR RAYMOND CUNNINGHAM
BY
Whittemore, Hulbert & Belknap
ATTORNEYS

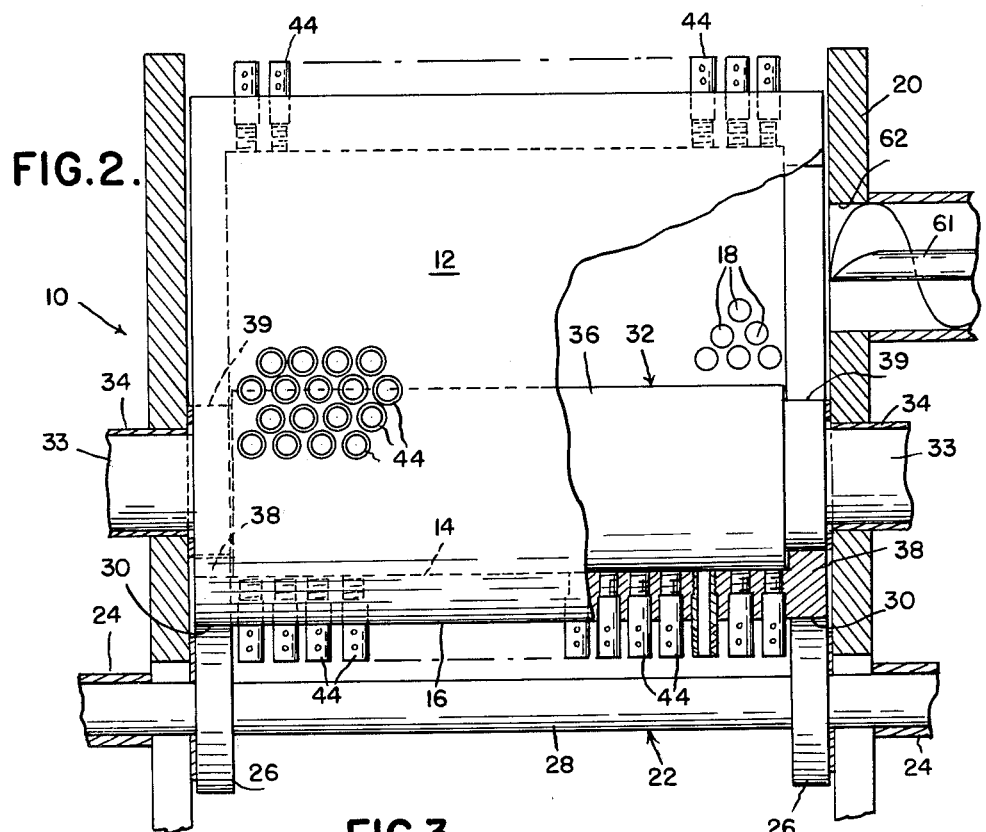
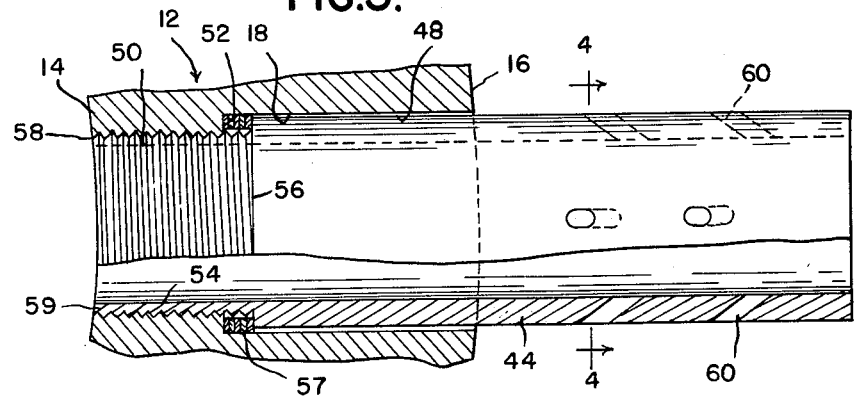
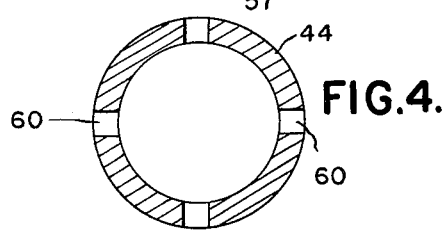

United States Patent Office 3,168,058
Patented Feb. 2, 1965

3,168,058
REPLACEABLE TUBE INSERT FOR A PELLETING MACHINE
Arthur Raymond Cunningham, 9615 S. Beverly Ave., Chicago 43, Ill.
Filed Oct. 1, 1962, Ser. No. 227,303
7 Claims. (Cl. 107—14)

This invention relates generally to a machine for compressing a cut crop into pellet or wafer form.

A cup crop, such as hay for example, is much more conveniently handled in a compressed dense form. Not only is handling easier but less storage space is required.

Accordingly, an essential object of the invention is to provide a machine for compressing a cut crop into dense pellet or wafer form characterized by its lighter construction and by the fact that it can be readily adjusted to produce longer and denser pellets, as desired.

Another object is to provide a machine for compressing and pelleting a cut crop having a pelleting member provided with holes through which the cut crop is to be pressed, and tubes mounted in the holes and projecting from the member.

Another object is to provide a machine wherein the tubes may be readily replaced by other tubes of different length. A longer tube will produce a denser pellet.

Another object is to provide a pelleting machine provided with a rotatable pelleting ring having circumferentially spaced holes extending generally radially therethrough and through which the cut crop is to be pressed, and tubes removably mounted in the holes and projecting therefrom beyond the radially outer surface of the ring.

Another object is to provide a pelleting machine wherein the inner ends of the tubes extend substantially flush with the radially inner surface of the ring and are sharpened to provide a knife-edge for more efficient operation.

Another object is to provide a machine as described in the preceding paragraph wherein the tubes are axially adjustably mounted in the holes so that periodically they may be resharpened and reset in the ring.

Another object is to provide a pelleting machine wherein the holes in the ring have relatively enlarged radially outer end portions and relatively reduced radially inner end portions with shoulders separating the relatively enlarged and reduced portions, and wherein the tubes have their radially inner ends threaded in the enlarged portions of the holes.

Another object is to provide a machine wherein the holes in the pelleting ring have relatively enlarged radially outer end portions and relatively reduced radially inner end portions separated by shoulders, the tubes have inner end portions of reduced outside diameter defining shoulders opposed to the shoulders in the holes, the reduced inner end portions of the tubes are threaded in the reduced portions of the holes, and shims are provided between the shoulders of the holes and tubes to axially locate the tubes in a predetermined position of adjustment.

Other objects and features of the invention will become apparent as the description proceeds, especially when taken in conjunction with the accompanying drawings, wherein:

FIGURE 2 is a fragmentary sectional view taken on the line 2—2 of FIGURE 1.

FIGURE 3 is an enlarged fragmentary sectional view of a portion of the wafering ring and a tube carried thereby.

FIGURE 4 is a sectional view taken on the line 4—4 of FIGURE 3.

Figure 1:
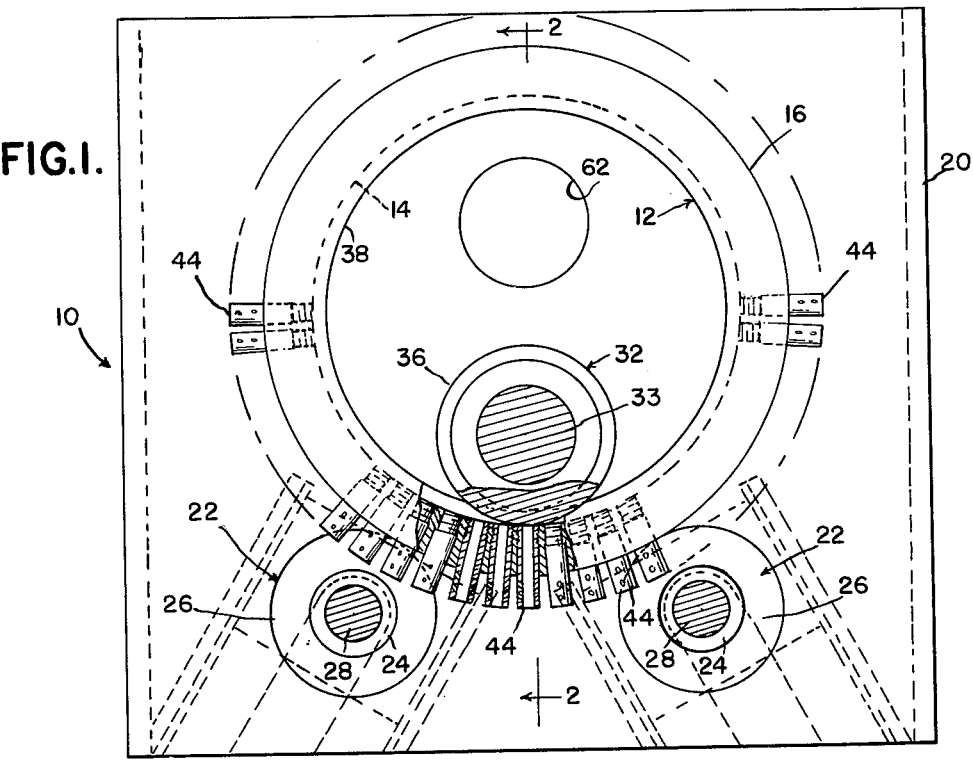
FIGURE 1 is an elevational view of a pelleting machine embodying my invention.

Referring now more particularly to the drawings and especially to FIGURES 1–3, the machine there illustrated is generally indicated at 10, and includes a wafering ring 12 formed with concentric cylindrical radially inner and outer surfaces 14 and 16. The ring has holes 18 extending radially therethrough from the radially inner to the outer surface thereof. The holes are arranged preferably in axially spaced rows, with the holes in each row circumferentially spaced from each other and staggered with respect to the holes in the adjacent rows. The ring 12 is supported for rotation within the housing 20, and for this purpose a pair of back-up rolls 22 is provided. The axes of the back-up rolls 22 are parallel to the axis of the pelleting ring 12, and the rolls 22 are supported in bearings 24 carried by the housing 20.

Each back-up roll 22 is formed with a pair of laterally spaced circular rims 26 supported on shaft 28. The rims 26 are spaced apart far enough to span the apertured outer surface 16 of the pelleting ring and engage the lateral surface extensions 30 of the ring.

Extending within the ring on an axis parallel thereto is a pressure roll 32 provided with spindles 33 journaled in bearings 34 in the housing 20. The pressure roll has an enlarged central cylindrical portion 36 of a width corresponding to that of the apertured portion of the pelleting ring.

It will be noted that the pelleting ring has inwardly projecting ribs 38 on opposite sides of the cylindrical inner apertured surface 14. The enlarged central portion 36 of the pressure roll fits between these ribs 38. There is a clearance between the cylindrical surface of the enlarged central portion 36 of the pressure roll and the opposed apertured inner surface 14 of the ring. The cylindrical portions 39 of the pressure roll on opposite sides of the enlarged central portion 36 closely approach, although perferably they do not contact, the ribs 38.

Suitable means are provided to positively drive the pressure roll 32 and the pelleting ring 12. Preferably the pressure roll is rotated at a speed such that the peripheral speed of the surface of its central portion 36 exceeds the peripheral speed of the radially inner apertured surface 14 of the ring. Hence there is a rubbing or chafing action on the crop material between these surfaces as it is pressed radially outward through the apertures 18 and tubes 44 therein. Preferably the surface of the cylindrical portion 36 of the pressure roll is knurled to increase the cutting and rubbing action on the crop to break it up into fine particles.

Referring now more particularly to FIGURES 2 and 3, it will be noted that the tubes at their inner ends extend flush with the inner surface of the ring, and project radially outward from the ring holes beyond the outer surface of the ring. The holes 18 have relatively large diameter cylindrical outer end portions 48 and relatively small diameter threaded inner end portions 50 separated by annular shoulders 52. The tubes have inner end portions 54 of reduced outside diameter defining annular shoulders 56, and the remaining cylindrical outer surface portions of tubes beyond the shoulders fit closely within the enlarged portions 48 of the holes. The reduced inner end portions of the tubes are externally threaded for engagement with the internal threads on the inner end portions 50 of the holes, and shims 57 are provided between the opposed shoulders of the holes and tubes to locate the tubes axially in the desired position of axial adjustment.

Preferably the tubes are shimmed so that the radially inner ends 58 thereof extend substantially flush with the inner surface 14 of the ring. Preferably also, the radially inner ends of the tubes are sharpened to provide a knife-edge 59 to cooperate with the knurled surface of the pressure roll and thereby increase the cutting and rubbing action on the crop as it is pressed into the tubes.

The tubes are formed with vent holes 60 in the outer projecting portions thereof which are slanted from the inner to the outer wall surface in a direction opposed to the outward movement of the developing pellets. The vents are provided to release moisture and vapor from the compressed crop material.

According to this construction, it is possible to periodically sharpen the radially inner ends of the tubes as they become dulled through use. Sharpening of course somewhat shortens the tubes and accordingly a shim may be removed to properly locate the tube in position with its resharpened edge flush with the radially inner surface of the ring. According to this construction also it is possible to substitute a different set of tubes, which might be longer for example, so as to produce a more densely compacted pellet. A longer tube produces a denser pellet. This construction also has the advantage that a radially thinner, and hence lighter, wafering ring may be employed, while retaining a relatively long pellet passage for compacting the pellet to the degree desired. In other words, the composite wafering annulus composed of the ring 12 and tubes 44 is much lighter than an annulus having a dimension from its radially inner to its radially outer surface equal to the distance from the surface 14 of the ring to the outer extremities of the tubes.

The crop material is introduced to the ring by an auger 61 which extends into an opening 62 in the housing. The crop material thus introduced drops onto the ring and is compressed into the tubes in the holes of the ring by the pressure roll 32. As the crop material extrudes from the outer ends of the tubes, it is cut off by any suitable cut-off device and drops to the bottom of the housing for removal by a suitable conveyor. The shafts 22 of the back-up rolls may be utilized as cut-off devices. Thus as the pellets extrude to a length sufficient to contact the shafts 22, they will break off and drop to the bottom of the housing.

Figure 5:
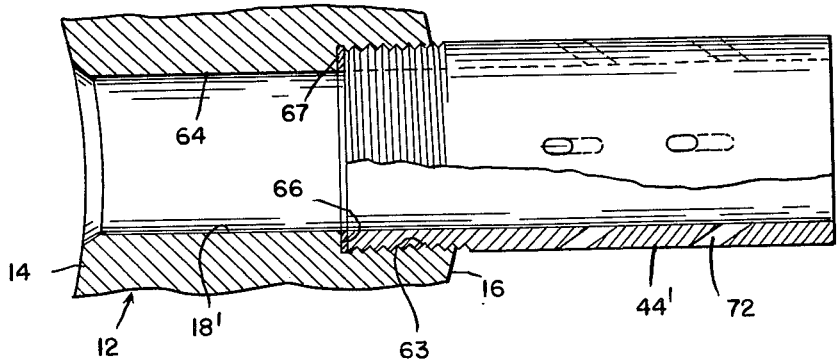
FIGURE 5 is similar to FIGURE 3 but shows a modification.

FIGURE 5 shows a modification wherein the holes 18' have relatively large threaded outer end portions 63 and relatively small cylindrical inner end portions 64 separated by annular shoulders 66; and the tubes 44' have their radially inner ends threaded in the enlarged portions of the holes and project from the holes radially outward beyond the radially outer surface of the ring. While only one hole and tube are shown, it will be understood that the configuration and construction of the others are the same.

These tubes 44' are shorter than the tubes 44. However it will be noted that the inner cylindrical surfaces of the tubes are of the same cross-section and diameter as the reduced portions 64 of the holes and accordingly extend flush with and in continuation of these reduced portions to provide a continuous pellet passage from the radially inner surface of the ring to the outer extremities of the tubes. The tubes are screwed in so that the radially inner ends engage the shoulders 66, or alternatively, washers or shims 67 may be provided between the ends of the tubes and the shoulders to vary the length of the pellet passage. Vent holes 72, similar to vents 60, are provided in the projecting portions of the tubes.

What I claim as my invention is:

1. In a machine for compressing and pelleting a cut crop, a rotatable ring having circumferentially spaced holes extending generally radially therethrough and through which the cut crop is to be pressed, said holes having relatively enlarged radially outer end portions and relatively reduced radially inner end portions, shoulders separating said relatively enlarged and reduced portions of said holes, and tubes disposed radially with respect to said ring, the radially inner end portions of said tubes extending into the enlarged portions of said holes, the radially inner ends of said tubes being in opposed relation to said shoulders, the inner end portions of said tubes being externally threaded from the radially inner ends thereof and having threaded engagement with the enlarged portions of said holes for axial adjustment of said tubes in said holes, said tubes projecting from said holes radially outward beyond the radially outer surface of said ring, the inner surfaces of said tubes being of the same size and shape as the reduced portions of said holes and extending substantially flush with and in continuation of said reduced portions, vent holes provided in the walls of the projecting portions of said tubes, said holes being inclined inwardly toward the axes of said tubes in an outward direction.

2. The structure defined in claim 1, wherein shim rings are disposed within the enlarged portions of said holes in abutting relation with and between said shoulders and said inner ends of said tubes.

3. In a machine for compressing and pelleting a cut crop, a pelleting member having holes therethrough from one side thereof to the other through which the cut crop is to be pressed, and tubes removably and longitudinally adjustably mounted in said holes and projecting from said member beyond the surface at one side of said member, the crop passages from said other side of said member which pass through said tubes being of uniform size and shape throughout substantially their full extent, said tubes having vent holes formed in the walls of the projecting portions thereof.

4. The structure defined in claim 3, wherein said tubes completely line said holes from one end thereof to the other, the aforesaid crop passages being defined in their entireties by the inner surfaces of said tubes.

5. The structure defined in claim 3, wherein one end of each tube is disposed adjacent the surface of said member at said other side of said member and defines a knife edge.

6. The structure defined in claim 3, wherein said holes have relatively enlarged portions adjacent said one side of said member and have relatively reduced portions adjacent said other side of said member, shoulders separating said portions, said tubes having reduced end portions threaded in the reduced portions of said holes, said tubes having shoulders opposed to the shoulders in said holes, and shims between the opposed shoulders of said holes and tubes to axially locate said tubes.

7. In a machine for compressing and pelleting a cut crop, a rotatable ring having circumferentially spaced holes extending generally radially therethrough and through which the cut crop is to be pressed, said holes having relatively enlarged radially outer end portions and relatively reduced radially inner end portions, shoulders separating said relatively enlarged and reduced portions of said holes, and tubes having their radially inner ends opposing said shoulders and being threaded in the enlarged portions of said holes and projecting from said holes radially outward beyond the radially outer surface of said ring, the inner surfaces of said tubes being of the same size and shape as the inner surfaces of said reduced portions of said holes so that the crop passages defined thereby are of substantially uniform configuration from end to end, said tubes having vent holes in the walls of the projecting portions thereof.

References Cited in the file of this patent

UNITED STATES PATENTS

| 2,149,920 | Kretchmer | Mar. 7, 1939 |
| 2,239,220 | Permentier | Apr. 22, 1941 |
| 2,759,219 | Meakin | Aug. 21, 1956 |
| 2,902,949 | Meakin | Sept. 8, 1959 |
| 2,958,900 | Meakin | Nov. 8, 1960 |

FOREIGN PATENTS

| 918,288 | France | Oct. 14, 1946 |